(12) United States Patent
Tryti et al.

(10) Patent No.: US 8,282,804 B2
(45) Date of Patent: *Oct. 9, 2012

(54) ELECTROSTATIC COALESCING DEVICE

(75) Inventors: Svein Tryti, Bødalen (NO); Peder Hansson, Jar (NO); Pål Jahre Nilsen, Bødalen (NO); Nicolai Gedde, Stebekk (NO)

(73) Assignee: Hamworthy PLC, Poole (GB)

( * ) Notice: Subject to any disclaimer, the term of this patent is extended or adjusted under 35 U.S.C. 154(b) by 436 days.

This patent is subject to a terminal disclaimer.

(21) Appl. No.: 12/301,228

(22) PCT Filed: May 15, 2007

(86) PCT No.: PCT/IB2007/001248
§ 371 (c)(1),
(2), (4) Date: Nov. 17, 2008

(87) PCT Pub. No.: WO2007/135503
PCT Pub. Date: Nov. 29, 2007

(65) Prior Publication Data
US 2009/0255816 A1 Oct. 15, 2009

(30) Foreign Application Priority Data
May 16, 2006 (NO) .................................. 20062212

(51) Int. Cl.
*B03C 5/02* (2006.01)
(52) U.S. Cl. ......... 204/673; 204/537; 204/672; 205/742
(58) Field of Classification Search .................. 204/673, 204/672
See application file for complete search history.

(56) References Cited

U.S. PATENT DOCUMENTS

| 1,569,595 | A | * | 1/1926 | Viets ................................. 96/91 |
| 3,162,592 | A | * | 12/1964 | Pohl ........................... 209/127.1 |
| 3,418,501 | A | * | 12/1968 | Felici et al. .................... 310/309 |
| 3,577,336 | A | * | 5/1971 | Shirley ........................... 204/665 |
| 3,649,865 | A | * | 3/1972 | Holmes ......................... 313/350 |

(Continued)

FOREIGN PATENT DOCUMENTS
DE 4026802 A1 2/1992
(Continued)

OTHER PUBLICATIONS
PCT/ISA/210—International Search Report—Oct. 24, 2007.
(Continued)

*Primary Examiner* — Jonathan Johnson
*Assistant Examiner* — Bryan D. Ripa
(74) *Attorney, Agent, or Firm* — Venable LLP; Eric J. Franklin

(57) ABSTRACT

An electrostatic coalescing device including at least one pair of sheet-shaped electrodes arranged at a distance from each other side-by-side. Each one of the electrodes includes a sheet-shaped conductive member of electrically conductive material. The mutual distance between the conductive members of the two electrodes of the pair varies along the electrodes as seen in a direction perpendicular to the intended flow direction of fluid passing through the flow passage between the electrodes. A power supply is configured to apply mutually different electric potentials to the conductive members of the electrodes of the pair so as to form an electric field between the electrodes. The conductive member of one electrode of the pair is planar, whereas the conductive member of the other electrode of the pair is corrugated.

16 Claims, 6 Drawing Sheets

U.S. PATENT DOCUMENTS

| | | | |
|---|---|---|---|
| 4,204,934 A * | 5/1980 | Warren et al. | 204/558 |
| 4,235,698 A * | 11/1980 | Arnaud | 204/648 |
| 4,240,908 A | 12/1980 | Swain et al. | |
| 4,255,615 A | 3/1981 | Huang et al. | |
| 4,332,167 A | 6/1982 | Sun et al. | |
| 4,702,815 A | 10/1987 | Prestridge et al. | |
| 4,804,453 A * | 2/1989 | Sublette et al. | 204/673 |
| 5,147,045 A * | 9/1992 | Chi et al. | 209/9 |
| 6,110,321 A | 8/2000 | Day et al. | |
| 6,129,829 A | 10/2000 | Thompson | |
| 2004/0022294 A1 | 2/2004 | Yamamori et al. | |
| 2004/0129578 A1* | 7/2004 | McLachlan et al. | 205/742 |
| 2005/0036924 A1* | 2/2005 | Nilsen et al. | 422/186.04 |
| 2005/0040045 A1* | 2/2005 | Nilsen et al. | 204/672 |

FOREIGN PATENT DOCUMENTS

| | | |
|---|---|---|
| EP | 1085632 | 3/2001 |
| GB | 1046317 | 10/1966 |
| GB | 2385009 A | 8/2003 |
| WO | WO-03049834 A1 | 6/2003 |
| WO | WO-2004/044367 A2 | 5/2004 |

OTHER PUBLICATIONS

PCT/ISA/237—Written Opinion of the International Searching Authority—Oct. 24, 2007.

* cited by examiner

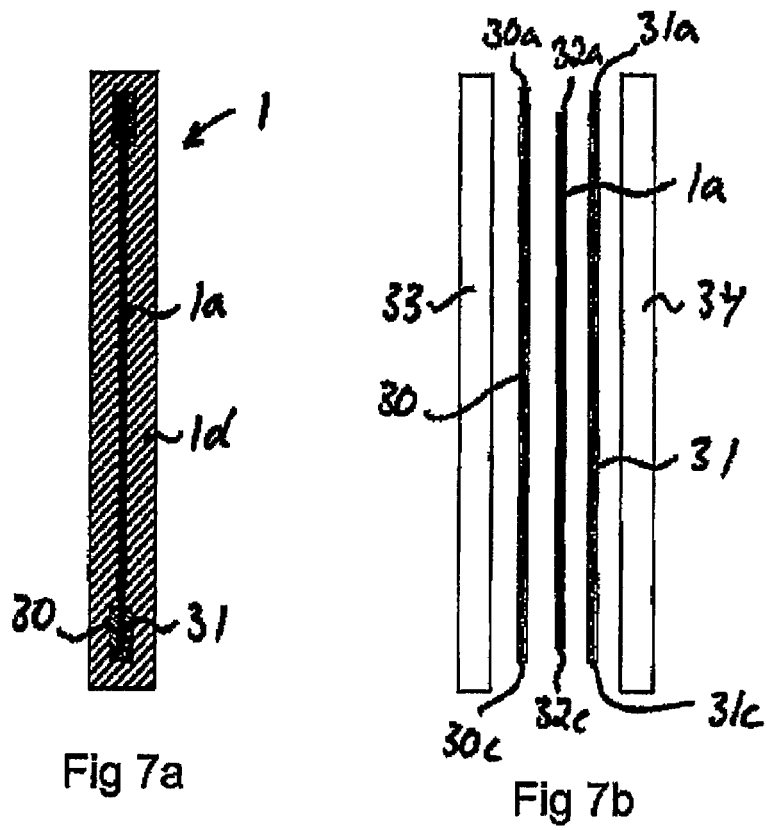
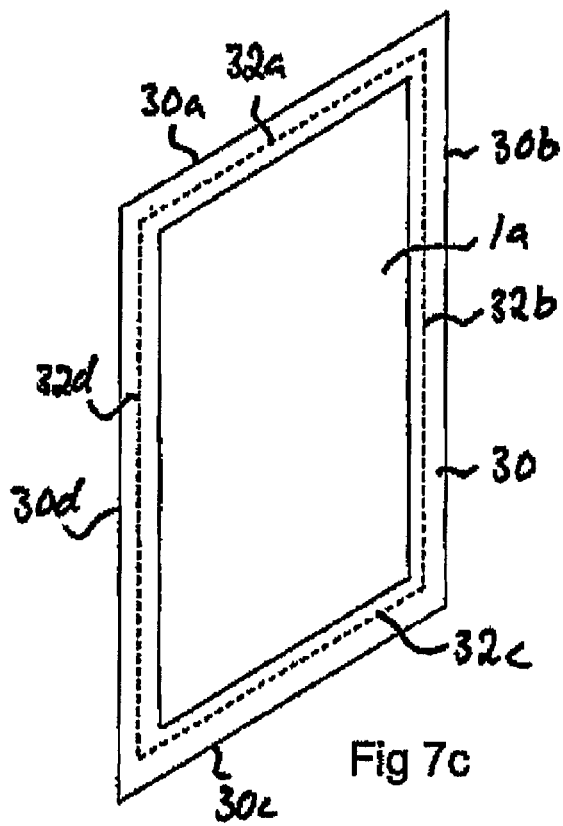

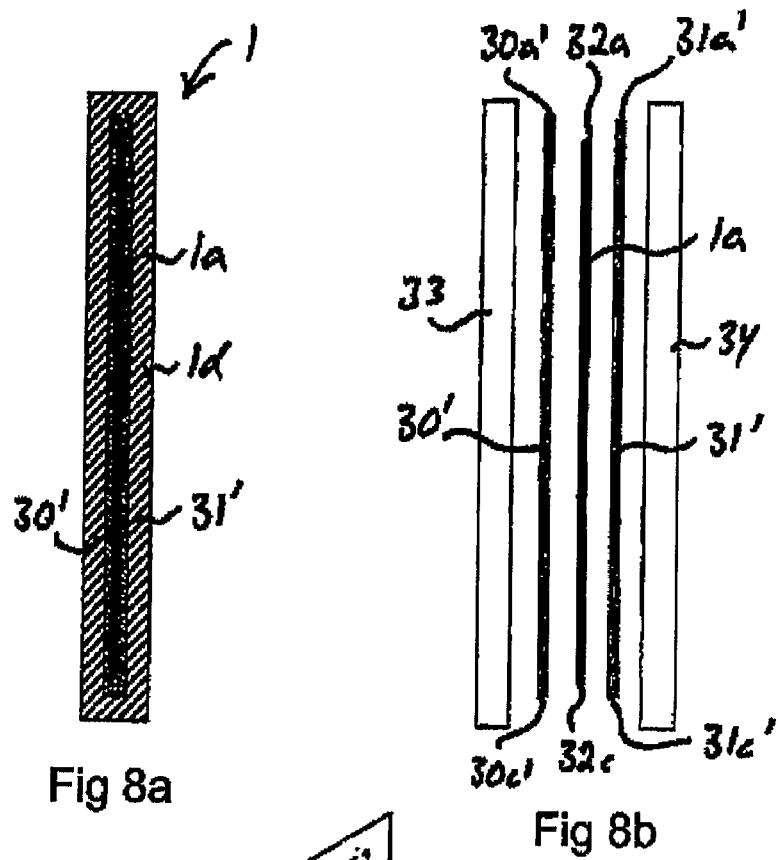
Fig 8a
Fig 8b
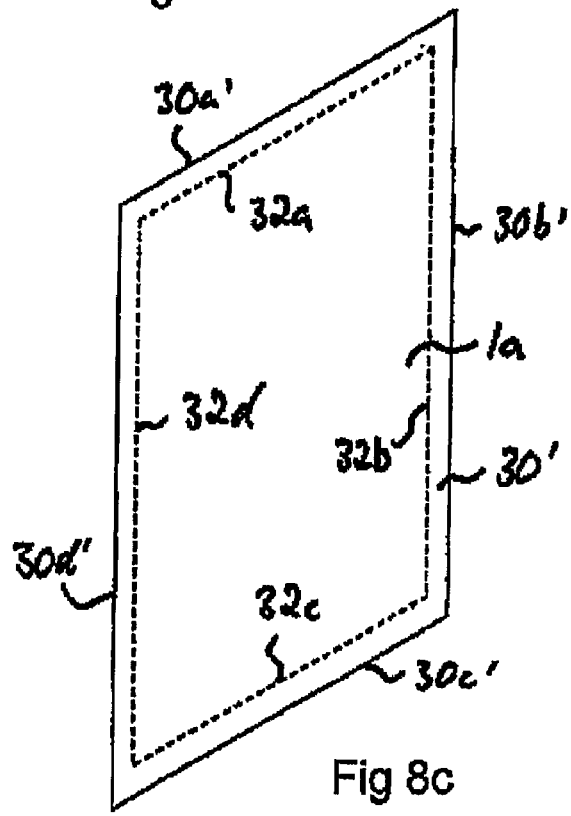
Fig 8c

ELECTROSTATIC COALESCING DEVICE

CROSS-REFERENCE TO RELATED APPLICATIONS

This application claims priority to Norwegian patent application 20062212 filed 16 May 2006 and is the national phase under 35 U.S.C. §371 of PCT/IB2007/001248 filed 15 May 2007.

FIELD OF THE INVENTION AND PRIOR ART

The present invention relates to an electrostatic coalescing device.

The invention is particularly applicable to electrostatic coalescing devices for promoting the coalescence of water in an emulsion comprising oil and water. However, the invention is applicable to any type of coalescing application where it possible to promote the coalescence of an emulsion component in an emulsion comprising a mixture of at least two different fluid components by means of an electric field applied to the emulsion.

In the oil and gas industry where oil is extracted from one or more wells in an oil field, oil will be extracted together with water. The water has to be removed from the oil and this is mainly done by means of settling tanks in which the oil is permitted to settle under the action of gravity. However, stable oil-water emulsions may develop during the production of the oil. For example, the use of gas-liquid cyclones might contribute to a stable emulsion that will be difficult to separate only by means of settling. After having passed through, for example, a series of gravitational settling tanks, a certain amount of water normally remains in the oil in the form of droplets. In order to promote the separation of this remaining water content, which is difficult to separate from the oil only by means of further gravitational settling, different types of coalescing devices have been proposed taking advantage of the fact that water and oil have different permittivity.

It is well known to use electrostatic coalescing devices in order to achieve water droplet enlargement or coalescence of water in water-in-oil emulsions, whereupon the water can be separated more easily from the oil, e.g. by means of gravitational separation or the like. An electrostatic coalescing device can be employed to speed up the separation of any emulsion where the continuous phase is an electrical insulator, such as oil, and the dispersed phase has a different permittivity than said continuous phase. The dispersed phase may for instance be an electrical conductor, such as water. In an electrostatic coalescing device, an emulsion is subjected to an alternating current field or to a continuous or pulsed direct current field.

WO 03/049834 A1 discloses an electrostatic coalescing device comprising several planar sheet-shaped electrodes extending in parallel with each other so as to form flow passages for an emulsion between each pair of adjacent electrodes. Different electric potentials are applied to the electrodes so as to form an electric field between each pair of adjacent electrodes, which e.g. will promote the coalescence of water contained in a water-in-oil emulsion flowing through the flow passages between the electrodes.

GB 2 385 009 A discloses an electrostatic coalescing device in the form of a so-called dielectrophoresis unit, which comprises several pairs of undulated sheet-shaped electrodes with the undulated electrodes of each pair arranged in such a manner in relation to each other that the mutual distance between the electrodes in each pair varies along the electrodes as seen in a direction perpendicular to the intended flow direction of fluid passing between the electrodes. The undulated electrodes in each pair are arranged side-by-side to define constrictive flow passage portions and widened flow passage portions. Thus, the electric field between the electrodes of each pair is inhomogeneous as seen in a cross section perpendicular to said flow direction, i.e. the field strength is different in different parts of the flow passage between the electrodes of each pair as seen in such a cross section. In an inhomogeneous electric field acting on an emulsion containing emulsion components of different permittivity, dielectrophoretic forces acting on the emulsion components will be generated. In an emulsion comprising water droplets in oil, the dielectrophoretic forces will contribute to moving individual water droplets to regions having a stronger electric field than neighboring regions so as to thereby form an enhanced concentration of water droplets in these regions, which will promote the coalescence of water droplets in these regions. The water droplets have a higher permittivity than the surrounding oil and will be affected by the dielectrophoretic forces acting in the direction of the field gradient of the inhomogeneous electric field between the electrodes.

SUMMARY OF THE INVENTION

The object of the present invention is to provide an electrostatic coalescing device of new and advantageous design.

According to the invention, this object is achieved by an electrostatic coalescing device.

The inventive coalescing device comprises:

at least one pair of sheet-shaped electrodes arranged at a distance from each other side-by-side so as to form a flow passage between them, each one of said electrodes comprising a sheet-shaped conductive member of electrically conductive material, the mutual distance between the conductive members of the two electrodes of said pair varying along the electrodes as seen in a direction perpendicular to the intended flow direction of fluid passing through the flow passage between the electrodes; and power supply means for applying mutually different electric potentials to the conductive members of the electrodes of said pair so as to form an electric field between the electrodes.

The processing of the fluids by means of the inventive coalescing device is based on the same principle as the above-indicated dielectrophoresis unit disclosed in GB 2 385 009 A. However, according to the invention, the conductive member of one electrode of said pair is planar, whereas the conductive member of the other electrode of the pair is corrugated. The inventive solution is based on the realization that the desired variance in the mutual distance between the conductive members of the two electrodes of each electrode pair may be accomplished by combining only one corrugated conductive member with a planar conductive member, while still achieving satisfying dielectrophoretic effects. By using a combination of a planar conductive member and a corrugated conductive member instead of two corrugated conductive members in each electrode pair, less accuracy is required in the mutual positioning of the conductive members as the ridges of the corrugated conductive member do not have to be arranged in parallel with and directly opposite any corresponding ridges of the other conductive member of the electrode pair. Furthermore, it is also easier to fabricate and handle an electrode comprising a planar conductive member than an electrode comprising a corrugated conductive member. It is for instance easier to firmly secure a layer of insulating material to a planar sheet-shaped conductive member than to a corrugated sheet-shaped conductive member.

In this description and the subsequent claims, a corrugated conductive member refers to a conductive member having a surface provided with alternating ridges and valleys extending along the surface. The ridges and valleys of the corrugated conductive member could be wave-like, as illustrated in FIGS. 1-3 of the appended drawings, or designed with sharp edges at the crests of the ridges and at the bottom of the valleys, as illustrated in FIGS. 5 and 6 of the appended drawings. The corrugated conductive member could for instance be folded, crinkled, wrinkled or undulated and could for instance have an undulated profile as illustrated in FIGS. 1-3 or a saw-tooth shaped profile as illustrated in FIGS. 5 and 6.

According to a particularly preferred embodiment of the invention, said planar sheet-shaped conductive member is at least partially enclosed by an insulation of electrically non-conductive material and electrically connected to the power supply means, whereas said corrugated sheet-shaped conductive member is grounded. In an electrostatic coalescing device of the type with electrodes arranged side-by-side, there is a risk of locally getting electric field strengths exceeding the breakdown voltage of the non-conductive component of the fluid passing between the electrodes, which will result in partial discharges in the fluid.

Such partial discharges may cause damages to the insulation of an electrode if they occur in close vicinity to or on the surface of the insulation and may contribute to a final breakdown of the insulation. For an electrostatic coalescing device in which the electrodes are subjected to high voltage, typically in the range of 1 kV to 20 kV, the electrical insulation is crucial in order to prevent short circuit currents between adjacent electrodes via the fluid passing between the electrodes. Breakdown of insulation may result in detrimental damages to the coalescing device. It has been noticed that the strongest electric fields between two adjacent electrodes of a coalescing device of the type here in question will occur at the regions of the ridges on the surface of the electrode comprising the corrugated conductive member. However, by having the corrugated conductive member grounded and thus connected to the same electrical potential as the electrically conductive component of the surrounding fluid or fluids, there is no requirement regarding insulation of the corrugated conductive member, in fact the corrugated conductive member may be uninsulated. It is therefore possible to optimise the material properties of the corrugated conductive member with respect to other demands, such as resistance to partial discharges.

According to another embodiment of the invention involving the use of an electrode comprising an insulated planar conductive member, a layer of semiconducting material is arranged between the planar conductive member and the associated insulation on at least one side of the planar conductive member, preferably on both sides thereof, surface-to-surface with the planar conductive member.

Said layer of semiconducting material may for instance be arranged to overlap one or several edges of the planar conductive member so as to smooth the electric field at said edge or edges. The electric field strength will be particularly strong at, near or around any sharp edge on the conductive member, which will make the electrical stress on the insulation material particularly high in such an area. This strong electric field could cause partial discharges on or near the outer surface of the insulation. By smoothing the electric field at, near or around one or several edges of the planar conductive member by means of an overlapping layer of semiconducting material, the electric field strength at, near or around said edge or edges will be substantially lower, which thus will reduce the risk of partial discharges. Said layer of semiconducting material is with advantage arranged to completely cover the associated side of the planar conductive member.

According to another embodiment of the invention, a layer of semiconducting material is arranged between the planar conductive member and the associated insulation on at least one side of the planar conductive member, preferably on both sides thereof, surface-to-surface with the planar conductive member and surface-to-surface with the insulation in order to prevent partial discharges in the associated area between the planar conductive member and the insulation. The semiconducting material will ensure that the electric potential around any gas pocket formed in this area between the planar conductive member and its insulation is constant or at least near constant so that no partial discharge will occur therein. Without such a layer of semiconducting material arranged between the planar conductive member and its insulation, there is a risk of partial discharges in any gas pocket formed in the interface between the conductive member and the insulation, which could cause damages to the insulation and contribute to a final breakdown of the insulation. Such gas pockets might be formed during the fabrication of an insulated electrode or at a later stage due to a possible imperfect adhesion between the conductive member of the electrode and the insulation.

According to another embodiment of the invention involving the use of an electrode comprising an insulated planar conductive member, the insulation of the electrode is at least partially covered by a layer of semiconducting material arranged surface-to-surface with the insulation in order to smooth the electric field on the outwardly facing surface of the insulation. When being in contact with a water-in-oil emulsion or an oil-in-water emulsion, the external surface of an insulated electrode may be exposed to a sharp interface between electrically conductive water continuous phase and almost electrically non-conductive oil continuous phase. The electric field strength will be particularly strong at such an interface, which will make the electrical stress on the insulation material particularly high in such an area. This strong electric field could cause partial discharges on or near the outer surface of the insulation. The external layer of semiconducting material will smooth the electric field on the external surface of the electrode and thereby the electric field strength at, near or around a surface area subjected to an interface of the above-indicated type will be substantially lower, which thus will reduce the risk of partial discharges. Said layer of semiconducting material is with advantage arranged to completely cover the associated side of the insulation.

The above-indicated layer or layers of semiconducting material between the conductive member and the insulation and/or on the outer surface of the insulation may also make it possible to reduce the thickness of the insulation as compared to the case when no such layer of semiconducting material is provided.

Further advantages as well as advantageous features of the inventive coalescing device will appear from the following description.

BRIEF DESCRIPTION OF THE DRAWINGS

With reference to the appended drawings, a specific description of preferred embodiments of the invention cited as examples follows below. In the drawings:

FIG. 7a is a schematic cross-sectional view of an electrode suitable for use in an electrostatic coalescing device according to the present invention, FIG. 7b is a schematic end view of different material layers used for forming the electrode of FIG. 7a, FIG. 7c is a schematic perspective view of a semiconducting layer used for forming the electrode of FIG. 7a, FIG. 8a is a schematic cross-sectional view of an electrode suitable for use in an electrostatic coalescing device according to the present invention, FIG. 8b is a schematic end view of different material layers used for forming the electrode of FIG. 8a, FIG. 8c is a schematic perspective view of a semiconducting layer used for forming the electrode of FIG. 8a, FIG. 9a is a schematic cross-sectional view of an electrode suitable for use in an electrostatic coalescing device according to the present invention, FIG. 9b is a schematic end view of different material layers used for forming the electrode of FIG. 9a, FIG. 9c is a schematic perspective view of the electrode of FIG. 9a.

DETAILED DESCRIPTION OF PREFERRED EMBODIMENTS OF THE INVENTION

Figure 1:
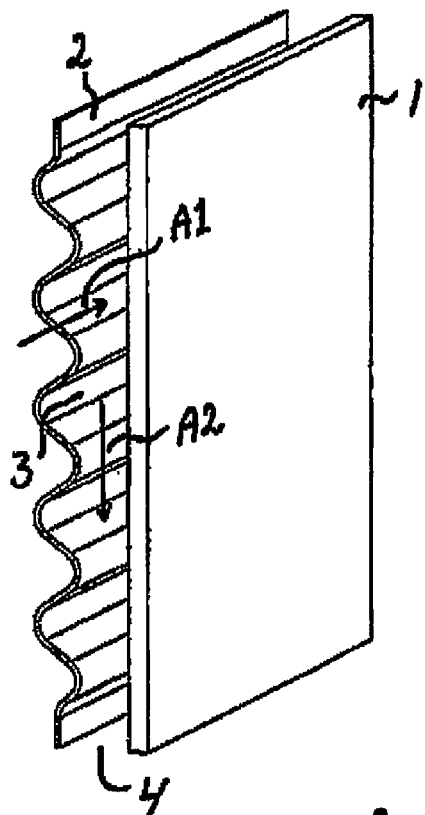
FIG. 1 is a schematic perspective view of a pair of electrodes included in an electrostatic coalescing device according to an embodiment of the present invention.
Figure 2:
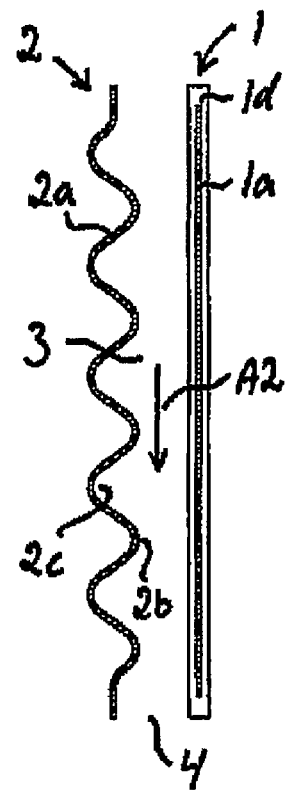
FIG. 2 is a schematic cross-sectional view of the electrodes of FIG. 1.

The electrostatic coalescing device according to the present invention comprises at least one pair of sheet-shaped electrodes 1, 2 arranged at a distance from each other side-by-side so as to form a flow passage 3 between them, as illustrated in FIGS. 1 and 2. Each electrode 1, 2 comprises a sheet-shaped conductive member 1a, 2a of electrically conductive material. According to the invention, the conductive member 1a of one electrode 1 of said pair is planar, whereas the conductive member 2a of the other electrode 2 of the pair is corrugated. Fluid is to flow through the flow passage 3 in the longitudinal direction of the ridges 2b and valleys 2c of the corrugated conductive member 2a. This intended flow direction is indicated by the arrow A1 in FIG. 1. Thus, the mutual distance between the conductive members 1a, 2a of the two electrodes of said pair varies along the electrodes as seen in a direction A2 perpendicular to the intended flow direction A1 of fluid passing through the flow passage 3 between the electrodes. Thus, when different electric potentials are applied to the conductive members 1a, 2a of the electrodes, the electric field between the electrodes will be inhomogenous as seen in a cross section perpendicular to said flow direction A1, i.e. as seen in the cross section illustrated in FIG. 2. The field strength will be different in different parts of the flow passage 3 between the electrodes 1, 2 as seen in such a cross section. When an emulsion containing emulsion components of different permittivity is passing through the flow channel 3 and subjected to said inhomogeneous electric field, dielectrophoretic forces acting on the emulsion components will be generated. In an emulsion comprising water droplets in oil, the dielectrophoretic forces will contribute to moving individual water droplets to the regions having a stronger electric field than neighboring regions, i.e. to the narrower sections between the conductive members 1a, 2a, so as to thereby form an enhanced concentration of water droplets in these regions, which will promote the coalescence of water droplets in these regions.

The coalescing device further comprises power supply means, not shown in FIGS. 1 and 2, for applying mutually different electric potentials to the conductive members 1a, 2a of the electrodes of said pair so as to form an electric field between the electrodes 1, 2.

In the embodiment illustrated in FIGS. 1 and 2, the planar conductive member 1a is at least partially enclosed by an insulation 1d of electrically non-conductive material, whereas the corrugated conductive member 2a is uninsulated. In this case, the planar conductive member 1a is to be electrically connected to a voltage source included in said power supply means, whereas the corrugated conductive member 2a is to be grounded and thus connected to the same electric potential as the electrically conductive component of the surrounding fluid or fluids.

Figure 3:
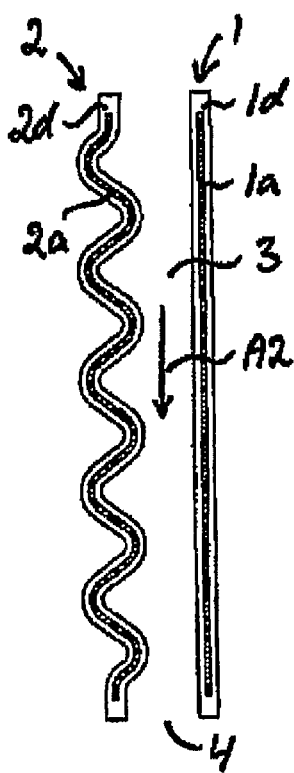
FIG. 3 is a schematic cross-sectional view of a pair of electrodes included in an electrostatic coalescing device according to an alternative embodiment of the invention.

As an alternative, both conductive members 1a, 2a could be enclosed, at least partially, by an insulation 1d, 2d of electrically non-conductive material, as illustrated in FIG. 3. In this case, the conductive members 1a, 2a could be electrically connected to different poles of a voltage source included in said power supply means.

The electrodes 1, 2 are preferably arranged to extend essentially vertically with an opening 4 extending along the lower end of the flow passage 3, i.e. between the lower edges of the electrodes 1, 2, so as to allow heavier components of an emulsion passing through the flow passage 3 between the electrodes to sink out of the flow passage 3 via this opening 4 under the action of gravity. The voltage source included in the power supply means could be an alternating voltage source or a direct-current voltage source. The voltage source is preferably a high-voltage transformer.

Figure 4:
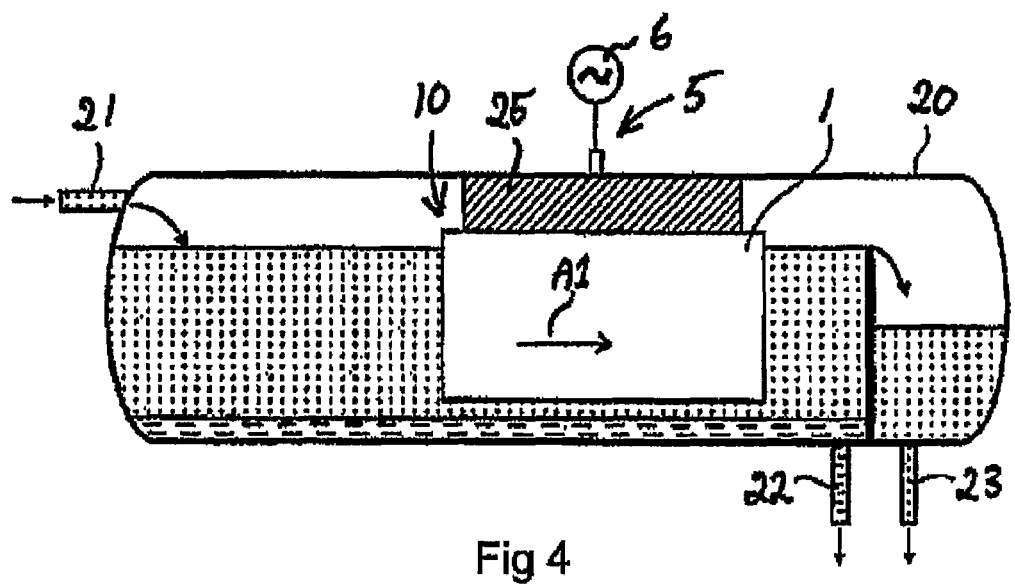
FIG. 4 is a schematic longitudinal sectional view of an electrostatic coalescing device according to an embodiment the present invention and an associated vessel.

FIG. 4 very schematically illustrates an electrostatic coalescing device 10 according to an embodiment of the present invention. In the illustrated example, the coalescing device 10 is located inside a vessel 20, which is provided with an inlet 21 for receiving an emulsion to be treated by the coalescing device 10. The vessel 20 is also provided with a first outlet 22 for a first emulsion component that has been separated from the emulsion in the vessel under the action of gravity, and a second outlet 23 for a second emulsion component or the remaining emulsion from which at least a part of said first emulsion component has been separated. The coalescing device 10 comprises several electrodes 1, 2 of the types described with reference to FIGS. 1-3 arranged side-by-side so as to form a set of electrodes 1, 2 with several intermediate flow passages 3, every second electrode 1 of said set comprising a planar conductive member 1a and every second electrode 2 comprising a corrugated conductive member 2a. The coalescing device 10 also comprises power supply means 5 including a voltage source 6 for applying mutually different electric potentials to the conductive members 1a, 2a of the electrodes of said set so as to form an electric field between each pair of adjacent electrodes 1, 2. The corrugated conductive members 2a are so arranged that the ridges 2b and valleys 2c thereof extend in a direction A1 corresponding to the normal flow direction for the emulsion received in the vessel

20. The electrodes 1, 2 are vertically arranged and are suspended by a holder 25 secured at the upper part of the vessel.

Figure 5:
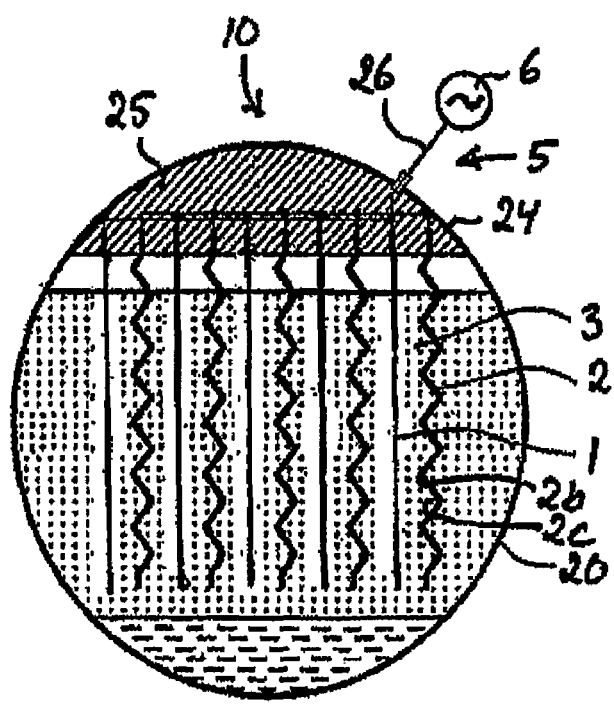
FIG. 5 is a schematic cross-sectional view of the coalescing device and the vessel of FIG. 4.

In the embodiment illustrated in FIG. 5, the planar conductive members 1a are electrically connected to the voltage source 6 of the power supply means 5 via a connection 26, whereas the corrugated conductive members 2a are grounded. In this case, each one of the planar conductive members 1a is at least partially enclosed by an insulation of electrically non-conductive material, whereas each one of the corrugated conductive members 2a may be uninsulated. In the illustrated example, the corrugated conductive members 2a are grounded by being electrically connected to the outer wall 24 of the vessel 20.

Figure 6:
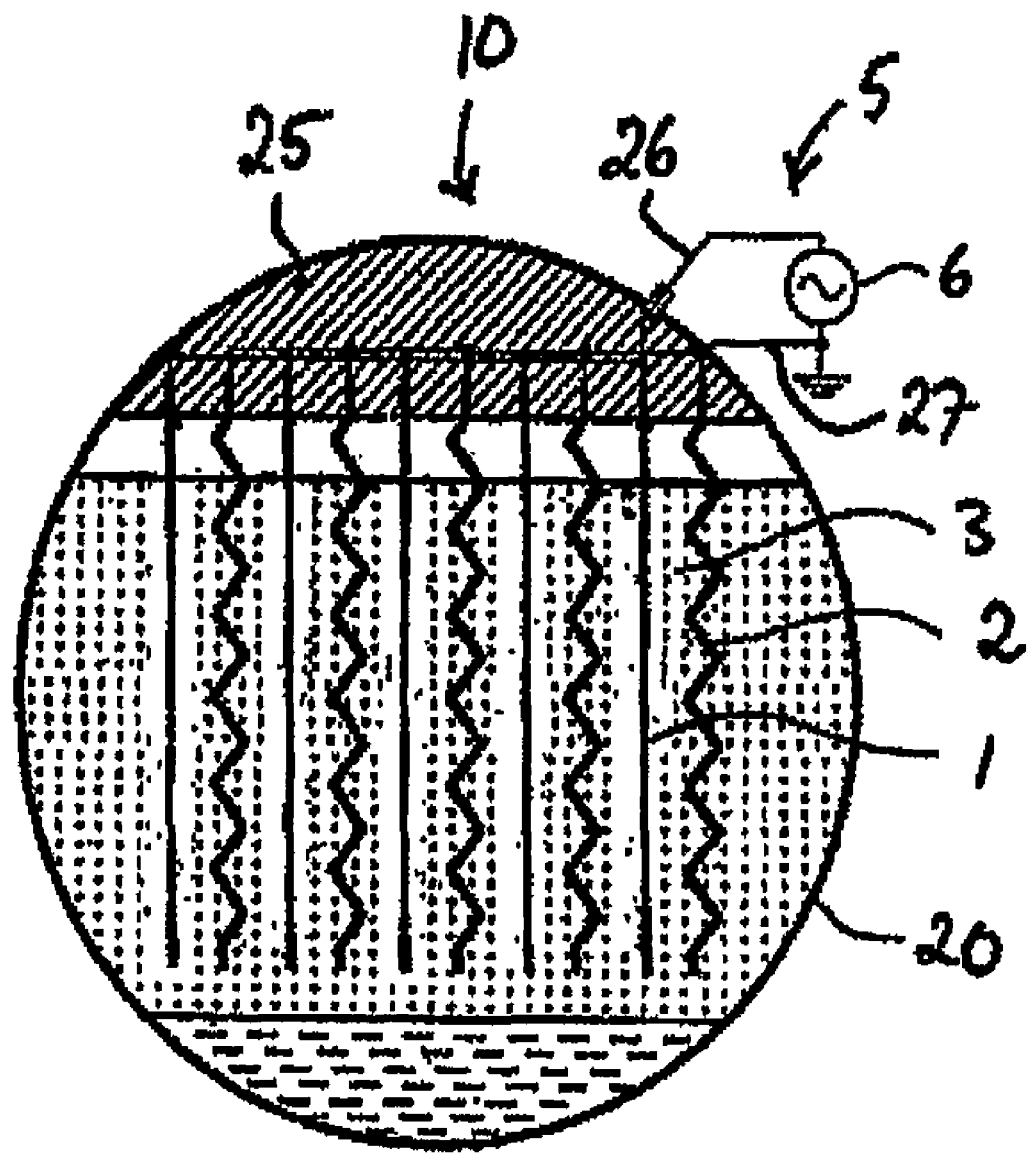
FIG. 6 is a schematic cross-sectional view of an electrostatic coalescing device according to another embodiment of the present invention and an associated vessel.

In the embodiment illustrated in FIG. 6, the conductive members 1a, 2a of all electrodes 1, 2 are all electrically connected to the voltage source 6 of the power supply means 5. The planar conductive members 1a are connected to a first pole of the voltage source 6 via a first connection 26 and the corrugated conductive members 2a are connected to another pole of the voltage source 6 via a second connection 27. Preferably, each one of the conductive members 1a, 2a is at least partially enclosed by an insulation of electrically non-conductive material in this case.

In the examples illustrated in FIGS. 4-6, the vessel 20 is a gravity settling tank. However, the inventive coalescing device is of course not limited to the use in such a settling tank. The inventive coalescing device could for instance be located in a tube, a pipeline or the like.

The coalescing device 10 may with advantage comprise several electrode sets of the above-indicated type. The electrodes 1, 2 of each set are preferably pre-assembled to form a separate electrode module. Each electrode set/module may be provided with its own power supply. Two or more of these sets/modules may be arranged at the side of each other so as to form a row of two or more electrode sets/modules and/or two or more of these sets/modules may be arranged above each other so as to form a column of two or more electrode sets/modules.

Different examples of electrodes 1 comprising a planar conductive member 1a suitable for use in an inventive coalescing device will be described in the following.

A layer of semiconducting material is with advantage arranged between the planar conductive member 1a and the associated insulation 1d on at least one side of the planar conductive member, preferably on both sides thereof, surface-to-surface with the planar conductive member. Each one of said layers 30, 30', 31, 31' of semiconducting material is suitably arranged to overlap one or several edges 32a-32d of the planar conductive member 1a, as illustrated in FIGS. 7a-7c and 8a-8c, so as to smooth the electric field at said edge or edges.

In the example illustrated in FIG. 7a-7c, each one of said layers 30, 31 of semiconducting material is shaped as a frame that overlaps all the outer edges 32a-32d of the planar conductive member 1a. In the illustrated example, the planar conductive member 1a is rectangular and the outer edges 32a-32d thereof are indicated by broken lines in FIG. 7c. The insulation 1d of the electrode 1 is suitably formed by two insulation layers 33, 34 of electrically non-conductive material arranged on opposite sides of the conductive member 1a. In this case, the respective layer 30, 31 of semiconducting material is arranged between the conductive member 1a and one of said insulation layers 33, 34, as illustrated in FIG. 7b, which shows the different layers of the electrode 1 in the intended order but separated from each other. In the illustrated example, the insulation layers 33, 34 are arranged to overlap all the outer edges 30a-30d, 31a, 31c (the vertical edges of layer 31 are not shown in the figures) of the intermediate layers 30, 31 of semiconducting material and the outer edges 32a-32d of the intermediate conductive member 1a.

In the example illustrated in FIG. 8a-8c, each one of said layers 30', 31' of semiconducting material is shaped as a continuous sheet that completely covers the associated side of the planar conductive member 1a and overlaps all the outer edges 32a-32d thereof. In the illustrated example, the planar conductive member 1a is rectangular and the outer edges 32a-32d thereof are indicated by broken lines in FIG. 8c. The insulation 1d of the electrode 1 is suitably formed by two insulation layers 33, 34 of electrically non-conductive material arranged on opposite sides of the conductive member 1a. In this case, the respective layer 30', 31' of semiconducting material is arranged between the conductive member 1a and one of said insulation layers 33, 34, as illustrated in FIG. 8b, which shows the different layers of the electrode 1 in the intended order but separated from each other. In the illustrated example, the insulation layers 33, 34 are arranged to overlap all the outer edges 30a'-30d', 31a', 31c' (the vertical edges of layer 31' are not shown in the figures) of the intermediate layers 30', 31' of semiconducting material and the outer edges 32a-32d of the intermediate conductive member 1a.

Each one of said layers 30, 30', 31, 31' of semiconducting material is preferably arranged surface-to-surface with the planar conductive member 1a and surface-to-surface with the insulation 1d, i.e. surface-to-surface with the associated insulation layer 33, 34, in order to prevent partial discharges in the associated area between the planar conductive member 1a and the insulation 1d.

With advantage, the insulation 1d of the electrode 1 is at least partially covered by a layer 35, 36 of semiconducting material arranged surface-to-surface with the insulation 1d in order to smooth the electric fields on the outwardly facing surface of the insulation.

Figures 9A, 9B:
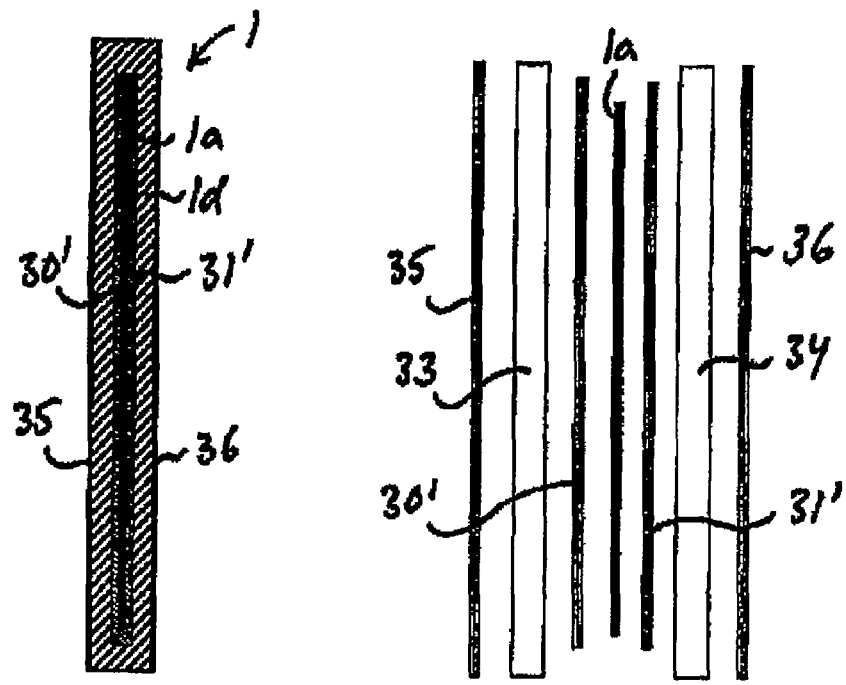
Figure 9C:
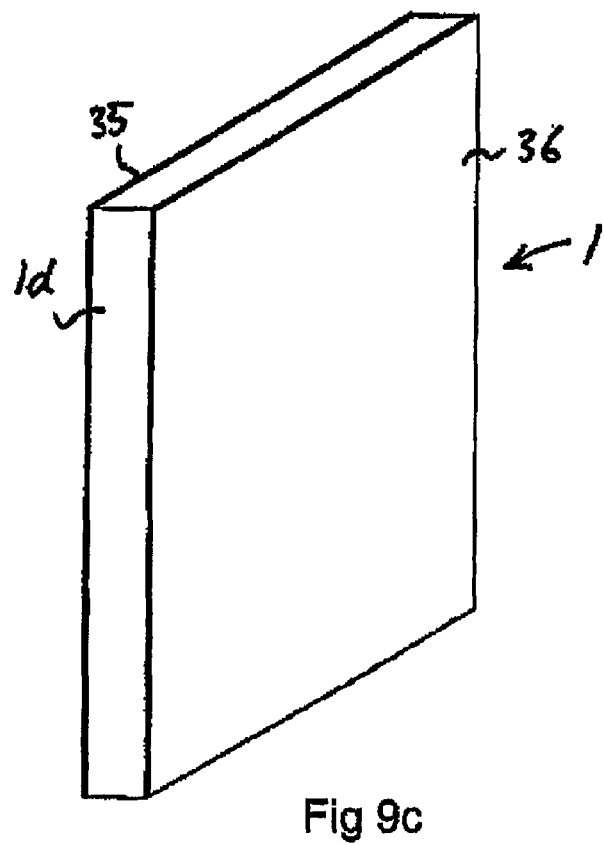

In the example illustrated in FIG. 9a-c, the insulation 1d of the electrode 1 is covered by layers 35, 36 of semiconducting material arranged surface-to-surface with the insulation 1d on the opposite sides thereof. These layers 35, 36 are arranged to cover the sides of the insulation 1d facing an adjacent electrode 2 of the coalescing device 10. In the illustrated example, the external layers 35, 36 of semiconducting material are arranged to completely cover these sides of the insulation 1d. The insulation 1d of the electrode 1 is suitably formed by two insulation layers 33, 34 of electrically non-conductive material arranged on opposite sides of the conductive member 1a. In this case, the respective external layer 35, 36 of semiconducting material is arranged on the outwardly facing surface of one of said insulation layers 33, 34, as illustrated in FIG. 9b, which shows the different layers of the electrode 1 in the intended order but separated from each other. In the illustrated example, the electrode 1 is also provided with layers 30', 31' of semiconducting material arranged between the conductive member 1a and the insulation 1d as described above with reference to FIGS. 8a-8c.

The above-indicated layers 30, 30', 31, 31', 35, 36 of semiconducting material suitably comprise a base material or matrix at least partially formed of the same material as the insulation 1d. This is favorable with respect to the bonding between these layers and the insulation 1d.

The conductive member 1a, 2a is for instance of aluminium, copper, steel or any other suitable metal.

The planar conductive member 1a may be provided with cavities extending through the conductive member 1a from one side to the other side thereof. In this case, said planar conductive member 1*a* may be formed by a metal net or a perforated metal plate or a woven mat, preferably a carbon fiber mat. Thermoplastic or thermoset material of material layers on the opposite sides of the conductive member 1*a* may be arranged to penetrate through at least some of said cavities so that these opposite layers are in contact with each other and bond to each other via these cavities.

A corona ring may be arranged to extend along and be in electrical contact with the edges of the planar conductive member 1*a*.

The insulation 1*d* may for instance comprise thermoplastic, thermoset, ceramic or rubber (e.g. fluoroelastomer) material. Preferably, the base or matrix of the insulation 1*d* is of thermoplastic or thermoset material. Said thermoplastic or thermoset material is with advantage a fluoropolymer or an epoxy with hardener. The insulation 1*d* may be formed by two or more superposed sheets of electrically non-conductive material. The insulation 1*d* is with advantage formed by prepreg. The insulation 1*d* preferably extends beyond the outer edges of the associated conductive member 1*a*.

The semiconducting material of the above-indicated layers 30, 31, 30', 31', 35, 36 may for instance be ceramic or plastic material with carbon.

Although the invention is applicable to any type of oil-treatment line, it is particularly advantageous in off-shore applications involving a coalescing device arranged for promoting or effectuating separation of water from oil or water droplet enlargement.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. An electrostatic coalescing device, comprising:
   a plurality of vertically extending pairs of sheet-shaped electrodes arranged at a distance from each other side-by-side so as to form a flow passage between them, each one of said electrodes comprising a sheet-shaped conductive member of electrically conductive material, the mutual distance between the conductive members of the two electrodes of each of said pairs varying along the electrodes as seen in a direction perpendicular to the intended flow direction of fluid passing through the flow passage between the electrodes, wherein the plurality of pairs of electrodes are arranged in sets, and wherein at least two sets are above each other with an intermediate flow passage between each of said pairs so as to form a column of at least two sets of electrodes; and
   a power supply configured to apply mutually different electric potentials to the conductive members of the electrodes of each of said pairs so as to form an electric field between the electrodes,
   wherein the conductive member of one electrode of each of said pairs is planar, whereas the conductive member of the other electrode of each of said pairs is corrugated.

2. The electrostatic coalescing device according to claim 1, further comprising:
   insulation comprising electrically non-conductive material at least partially enclosing said planar conductive member.

3. The electrostatic coalescing device according to claim 2, wherein said planar conductive member is electrically connected to the power supply, whereas said corrugated conductive member is grounded.

4. The electrostatic coalescing device according to claim 3, wherein said grounded corrugated conductive member is uninsulated.

5. The electrostatic coalescing device according to claim 2, further comprising:
   a layer of semiconducting material arranged between the planar conductive member and the associated insulation on at least one side of the planar conductive member, surface-to-surface with the planar conductive member.

6. The electrostatic coalescing device according to claim 5, wherein said layer of semiconducting material overlaps one or several edges of the planar conductive member so as to smooth the electric field at said edge or edges.

7. The electrostatic coalescing device according to claim 5, wherein said layer of semiconducting material completely covers the associated side of the planar conductive member.

8. The electrostatic coalescing device according to claim 5, wherein said layer of semiconducting material is arranged surface-to-surface with the planar conductive member and surface-to-surface with the insulation in order to prevent partial discharges in the associated area between the planar conductive member and the insulation.

9. The electrostatic coalescing device according to claim 2, wherein the insulation is at least partially covered by a layer of semiconducting material arranged surface-to-surface with the insulation in order to smooth the electric field on the outwardly facing surface of the insulation.

10. The electrostatic coalescing device according to claim 5, wherein said layer of semiconducting material comprises a base material or matrix at least partially comprising the same material as the insulation.

11. The electrostatic coalescing device according to claim 2, wherein said planar conductive member comprises cavities extending through the conductive member from one side to the other side thereof, thermoplastic or thermoset material of material layers on the opposite sides of the conductive member penetrating through at least some of these cavities so that these opposite layers are in contact with each other and bond to each other via these cavities.

12. The electrostatic coalescing device according to claim 2, wherein said planar conductive member comprises a metal net or a perforated metal plate or a woven mat.

13. The electrostatic coalescing device according to claim 2, further comprising:
   a corona ring extending along and in electrical contact with the edges of said planar conductive member.

14. The electrostatic coalescing device according to claim 1, wherein two or more of these pairs are arranged at the side of each other so as to form a row of two or more pairs of electrodes.

15. The electrostatic coalescing device according to claim 14, wherein the electrodes of each pair are assembled to form a separate module.

16. The electrostatic coalescing device according to claim 1, wherein each one of said electrodes extends essentially vertically.

* * * * *